(12) United States Patent
Stevens

(10) Patent No.: US 10,259,543 B2
(45) Date of Patent: Apr. 16, 2019

(54) SYSTEM FOR STORAGE AND PRODUCTION OF ELECTRICAL ENERGY IN A MARINE ENVIRONMENT

(71) Applicant: Louis Stevens, Rixensart (BE)

(72) Inventor: Louis Stevens, Rixensart (BE)

(*) Notice: Subject to any disclaimer, the term of this patent is extended or adjusted under 35 U.S.C. 154(b) by 1 day.

(21) Appl. No.: 15/566,165

(22) PCT Filed: Apr. 8, 2016

(86) PCT No.: PCT/EP2016/056911
§ 371 (c)(1),
(2) Date: Oct. 12, 2017

(87) PCT Pub. No.: WO2016/165941
PCT Pub. Date: Oct. 20, 2016

(65) Prior Publication Data
US 2018/0111666 A1  Apr. 26, 2018

(30) Foreign Application Priority Data
Apr. 14, 2015  (BE) .................................. 2015/5239

(51) Int. Cl.
*B63B 35/44* (2006.01)
*F03B 13/10* (2006.01)
(Continued)

(52) U.S. Cl.
CPC .............. *B63B 35/44* (2013.01); *F03B 13/00* (2013.01); *F03B 13/10* (2013.01); *F03G 3/00* (2013.01);
(Continued)

(58) Field of Classification Search
CPC ............ B63B 35/44; B63B 2035/4486; B63B 2035/4466; F03B 13/10; F03B 13/00; F03G 3/00; F05B 2260/42; F05B 2240/97
(Continued)

(56) References Cited

U.S. PATENT DOCUMENTS 3,281,765 A * 10/1966 Taplin ................. G10K 11/006
174/69
5,359,229 A * 10/1994 Youngblood ....... F03B 13/1855
290/42

(Continued)

FOREIGN PATENT DOCUMENTS

DE    10 2006 059233 A1    3/2008
WO    WO 2009/012575 A1    1/2009
(Continued)

*Primary Examiner* — Hoang M Nguyen
(74) *Attorney, Agent, or Firm* — Harness, Dickey & Pierce, P.L.C.

(57) ABSTRACT

The invention relates to a system for the storage and production of electrical energy in a marine environment, wherein at least one ballast is lowered from a high position to a low position and then raised, by means of at least one cable (115) connected to a barge or platform (110). The barge comprises a generator/motor (113) actuated by the cable or actuating same. The ballasts (107, 108) are secured to a partially floating element (106) which is itself connected, by a retaining cable (105), to an element (101) floating on the surface and provided with means for varying the length of said retaining cable (105), the partially floating element (106) comprising a volume of gas compressible according to the surrounding pressure.

18 Claims, 14 Drawing Sheets

(51) Int. Cl.
*F03G 3/00* (2006.01)
*F03B 13/00* (2006.01)

(52) U.S. Cl.
CPC .............. *B63B 2035/4466* (2013.01); *B63B 2035/4486* (2013.01); *F05B 2240/97* (2013.01); *F05B 2260/42* (2013.01)

(58) Field of Classification Search
USPC .............................. 60/495–507; 290/42, 53
See application file for complete search history.

(56) References Cited

U.S. PATENT DOCUMENTS

| | | | |
|---|---|---|---|
| 6,857,266 B2 * | 2/2005 | Dick | B63B 35/44 60/496 |
| 2009/0165454 A1 * | 7/2009 | Weinberg | F03B 13/1855 60/497 |
| 2009/0309366 A1 * | 12/2009 | Moore | B63B 35/44 290/53 |
| 2016/0032887 A1 * | 2/2016 | Patton | F03B 13/262 60/504 |

FOREIGN PATENT DOCUMENTS

| | | |
|---|---|---|
| WO | WO 2012/034104 A1 | 3/2012 |
| WO | WO 2014/078064 A1 | 5/2014 |
| WO | WO 2014/160522 A1 | 10/2014 |

\* cited by examiner

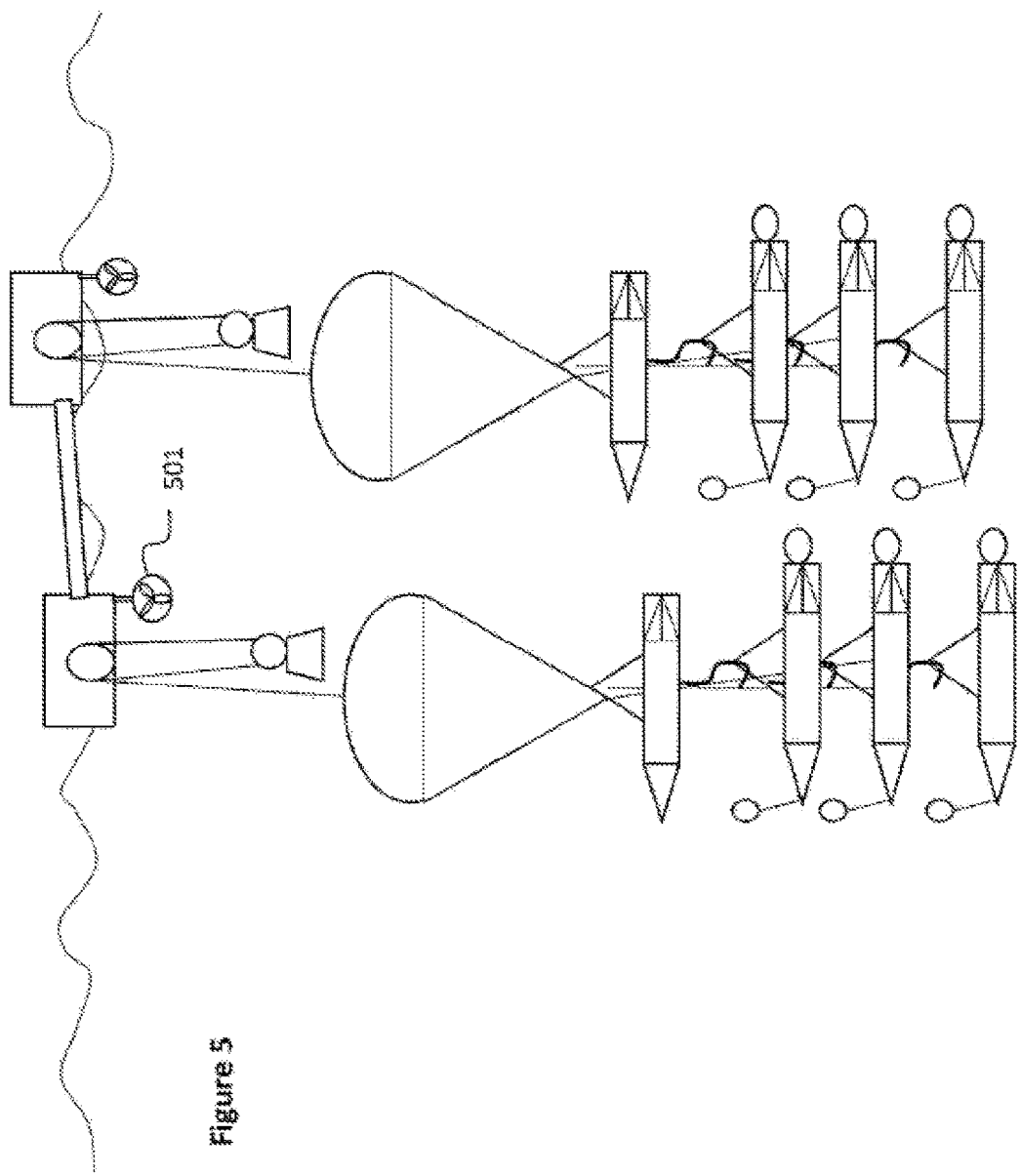

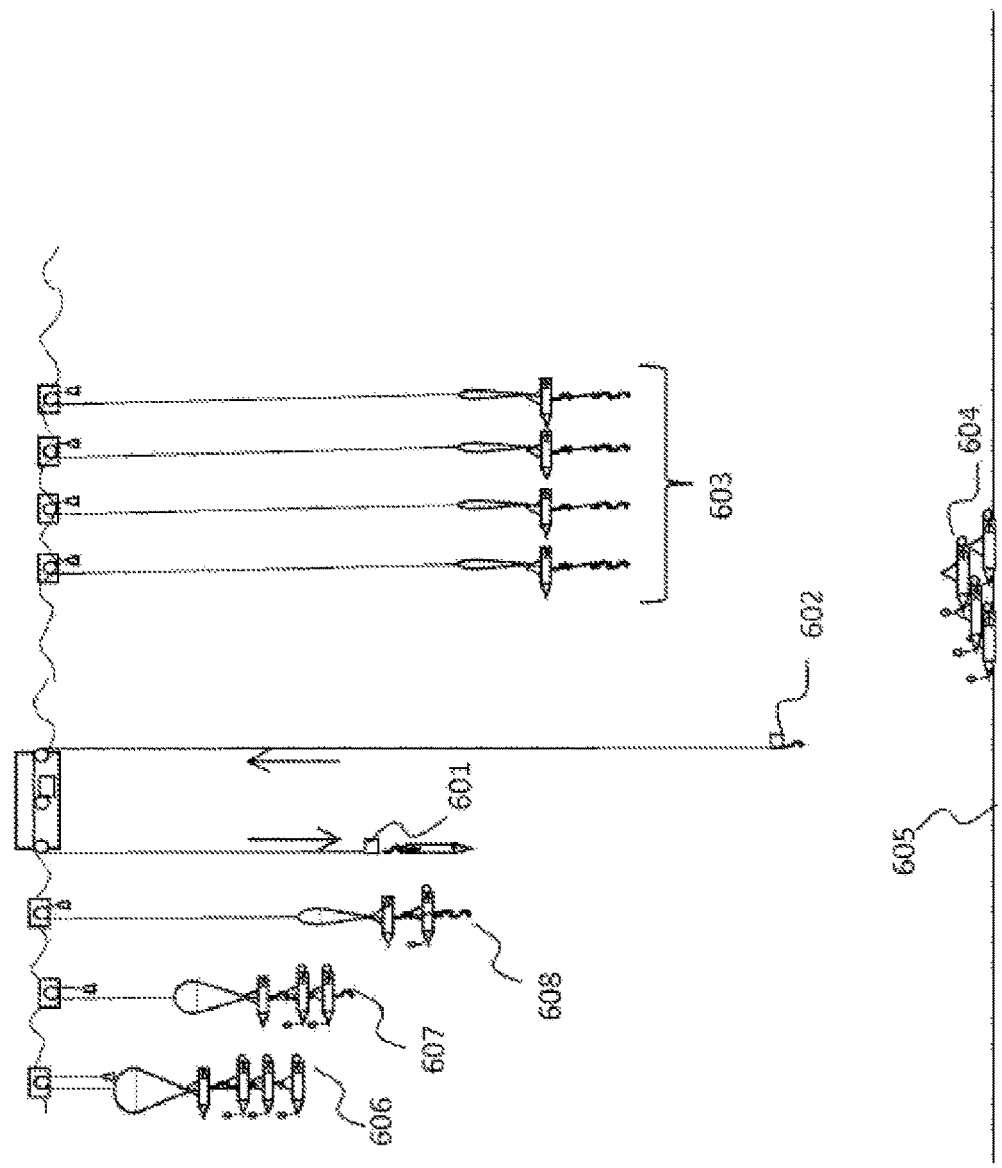

SYSTEM FOR STORAGE AND PRODUCTION OF ELECTRICAL ENERGY IN A MARINE ENVIRONMENT

CROSS-REFERENCE TO RELATED APPLICATIONS

This application is a U.S. National Stage of International Application No. PCT/EP2016/056911, filed on Apr. 8, 2016, which claims the benefit of, and priority to, Belgian Patent Application No. 2015/5239, filed on Apr. 14, 2015. The entire disclosures of each of the above applications are incorporated herein by reference.

The present invention provides a system of energy storage and production in a water environment, particularly in a marine environment.

Patent document WO 2014/160522 describes the prior state of art and discloses such a system, including a platform and a set of ballasts arrayed on a sea bottom, whereby each ballast may be moved from a given depth to another depth thanks to a winch on the platform. This system includes means to localize and seize ballasts with remote controls, which can be independent or connected to the winch system. According to the mode of realization, the ballast may include a volume of gas that can vary under the action of possibly remote-controlled valves, hence they can be partially self-floating.

However, on a large scale, the required platform to store the ballasts is sized so that the wind and surface currents will generate very high anchorage or stabilization costs.

The present invention is designed, among others, to avoid such drawback.

According to the invention, the ballasts in high position of energy storage are stabilized at such a depth that the effects of wind and current are considerably reduced.

Its solution includes the creation of a system, where at least one float that carries the ballasts is divided in at least parts connected with a retaining cable. The bigger part includes the immersed ballast(s) and is advantageously several dozen meters below the surface (where the current is weaker). This float is called USPV below in the present description (Unité de Suspension à Profondeur Variable).

The immersed part of the float includes a volume of gas in contact with the environmental pressure, possibly provided inside a flexible wrap. When the ballast(s) are dropped (one by one), the gas volume will be reduced under the action of the environmental pressure to prevent the immersed part of the float from getting up and go adrift with the wind or the surface current, because it will go down deeper thanks to the retaining cable that will be partly unlocked. This part of the float will induce a weaker upward force that will match the also weaker downward force from the remaining ballast(s).

The gas volume may be contained within a balloon or "lifting bag" or inside the upper part of a rigid enclosure in contact with water.

For example, the surface float part can have a 100-m$^3$ volume. The immersed part of the float can have a 300-m$^3$ volume. The weight of a float can be ca. 100 tons. The length of the main cable shall depend on the depth of the bottom of the sea, for example 4,000 m.

The invention is further described below as various modes of realization in reference to the following figures:

FIG. 5 shows another way to maintain the one or several USPVs in a given position thanks to pitch propellers.

FIG. 6 shows the various levels of charge of the USPVs and the various positions of the ballast on the block and tackle.

Figure 1:
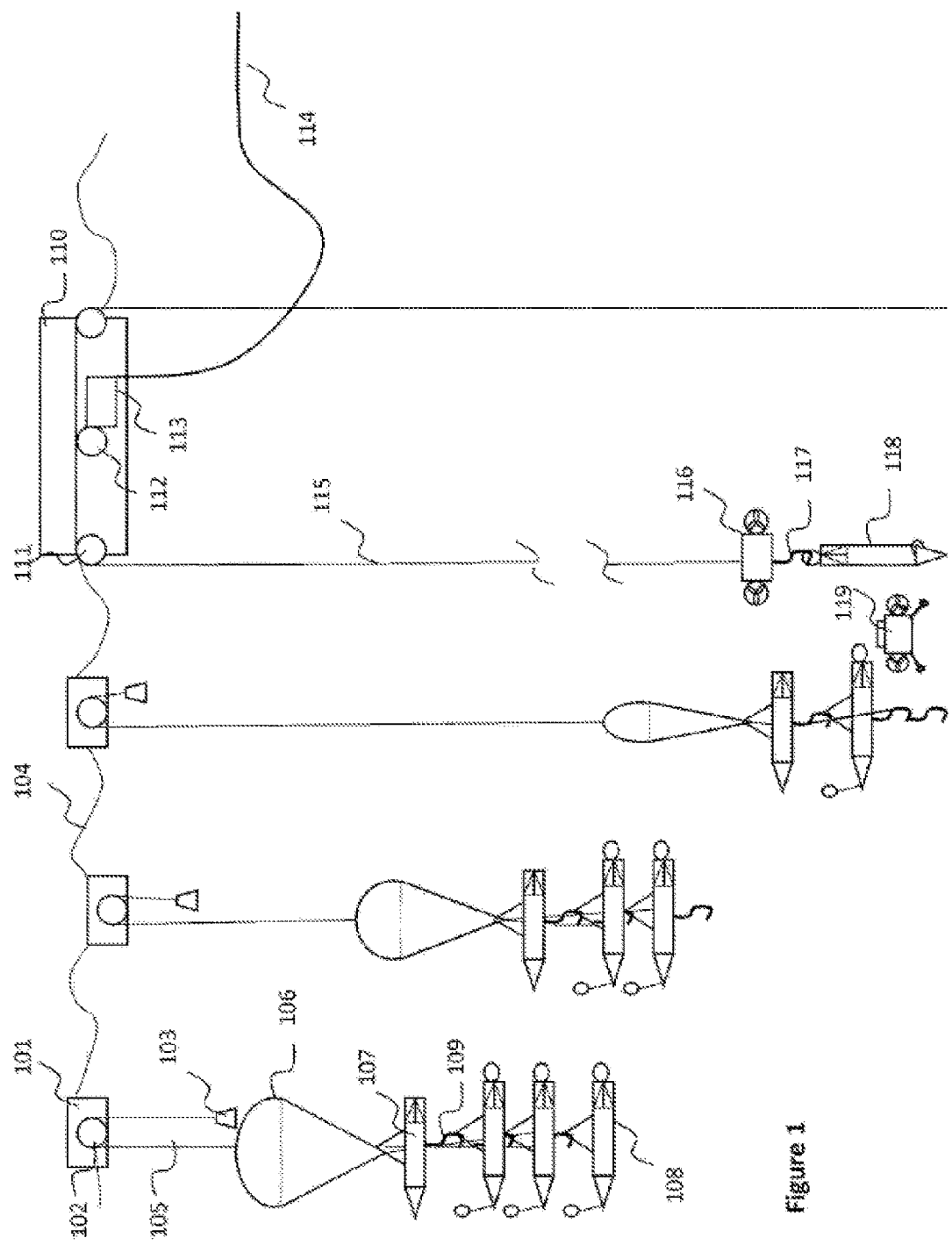
FIG. 1 shows several USPVs with different levels and with different lifting bag depths (balloon or flexible wrap of the immersed part of the float).

In more detail, FIG. 1 shows several USPVs with various charge levels and various depths of the lifting bag (balloon or flexible wrap). The float or barge (101) includes a capstan or a pulley (102) linked with a cable (105) to the lifting bag (106) on one side and to a weight (103) on the other side to balance the charges. The lifting bag makes it possible to hang several ballasts (107 and 108), including one that cannot be unhooked (107), in order to maintain the charge, no matter the level of volume (hence the depth) of the lifting bag. Each ballast hangs to the lifting bag though a hook and a cable (109), whose length may advantageously vary from a ballast to another, so that they don't hang at the same height and do not snap.

Close to the USPVs, there is a barge, with several blocks and tackles, or winches or sheave elevators on it, that make the ballasts go one by one down from the USPVs to the bottom of the sea and up from it, and thus release or store electrical energy thanks to an electrical generator/engine connected to the block and tackle via driving pulleys or connected to the winches or to the sheave elevator.

FIG. 1 shows the barge (110), the cable of a double block and tackle (115), a set of driving pulleys (112), a set of de-multiplying pulleys (111), whereby the electrical generator/engine (113) is connected to the driving pulleys. It can be linked to the pulleys through a reduction gear (not displayed on this view). The sea level is shown as 104. The generator/engine (113) and the barge (110) are connected to the electrical network through an underwater electrical cable (114).

The cable (115) of the block and tackle is linked to a hook (117) that can move horizontally thanks to a ROV (116) (ROV=remotely operated vehicle).

In the example of the double block and tackle, both hooks are linked to a ROV (the second hook is not displayed in FIG. 1).

Another independent ROV can be used to hook and unhook the ballasts easier from the USPVs (119).

The barge (110) can be anchored to the bottom of the sea or maintained by one or several pitch propellers. If it is anchored, it can be moved horizontally by linking the anchoring cables to winches that can be controlled, so that the barge is positioned close to the USPV while loading or unloading, or close to the storage zone on the bottom of the sea.

The USPVs can be stand-alone or linked with each other several ways.

Figure 2:
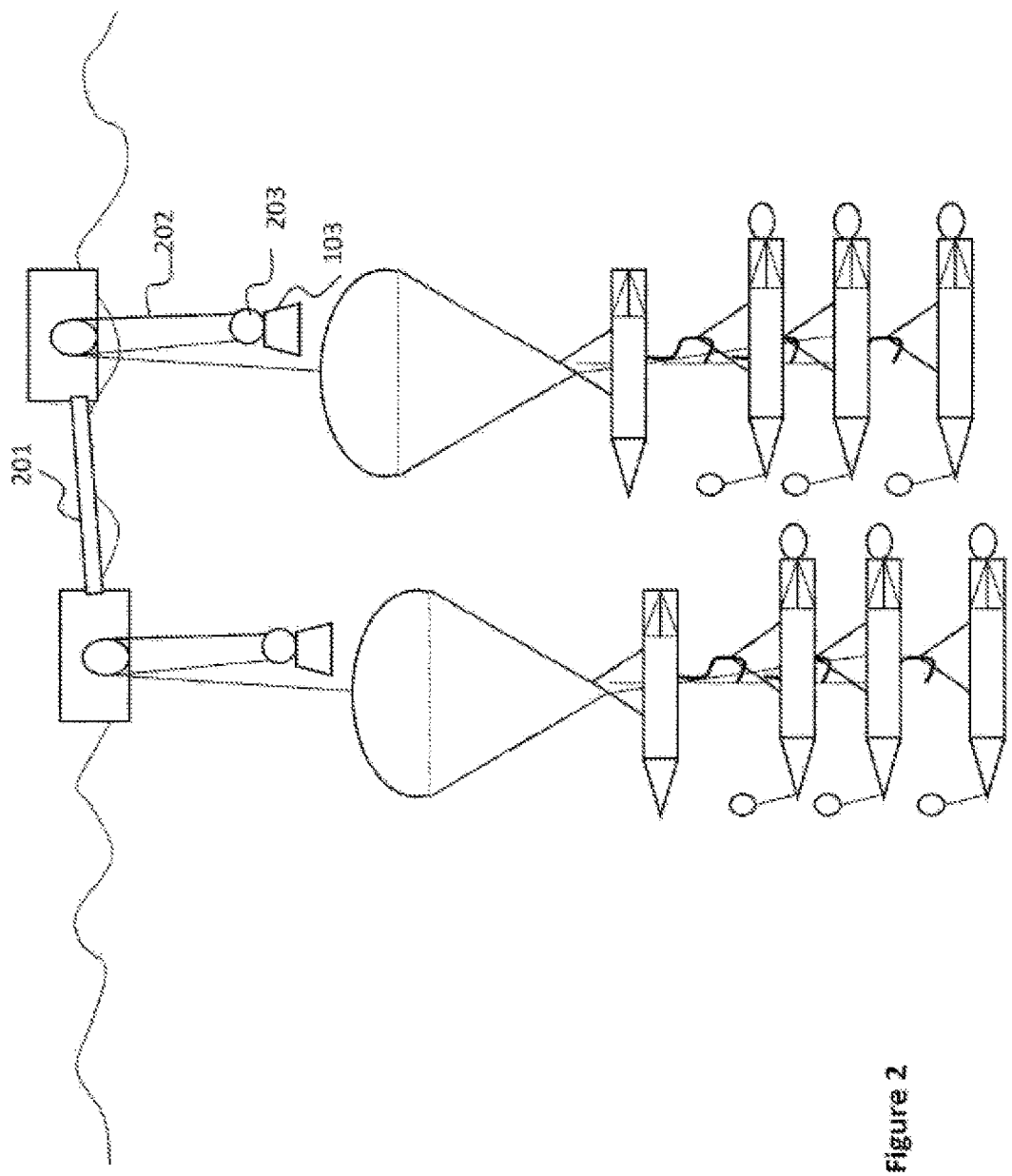
FIG. 2 shows a way to secure several USPVs together with a beam (201) fixed to each USPV via a cable or a mounting ball system.

FIG. 2 shows a way to secure several USPVs together with a beam (201) fixed to each USPV via a cable or a mounting ball system (not displayed in the figure). This figure also shows a system to multiply the power of the cable (202) between the float and the counterweight (103) through a set of pulleys (203). It is advantageous, since the distance that the counterweight has to travel is less than the change of depth of the lifting bag (106).

Figure 3:
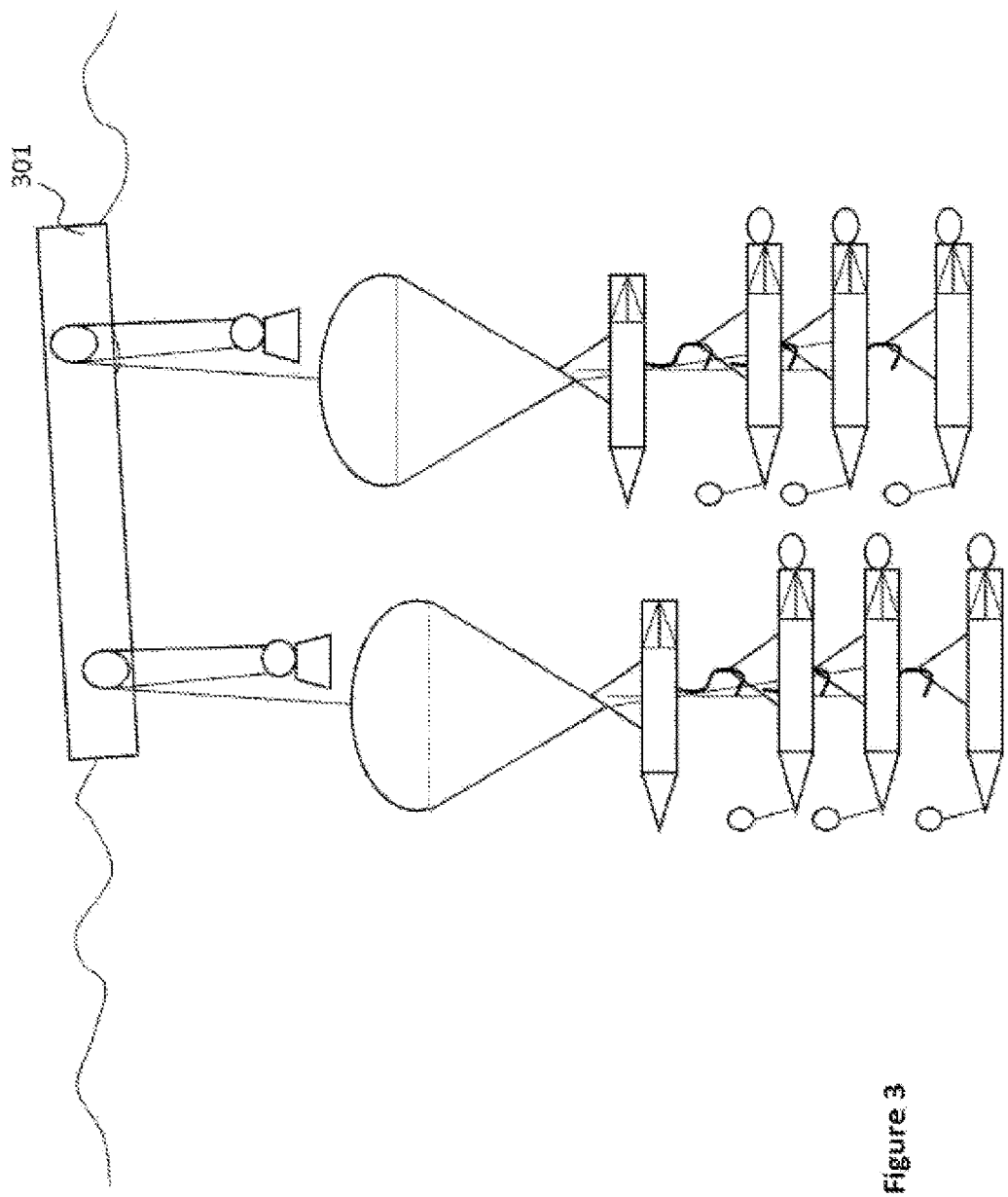
FIG. 3 shows another way to secure the USPVs together by positioning them on a lonely barge (301).

FIG. 3 shows another way to secure the USPVs together by positioning them on a lonely barge (301). On this figure, only 2 USPVs are shown.

Figure 4:
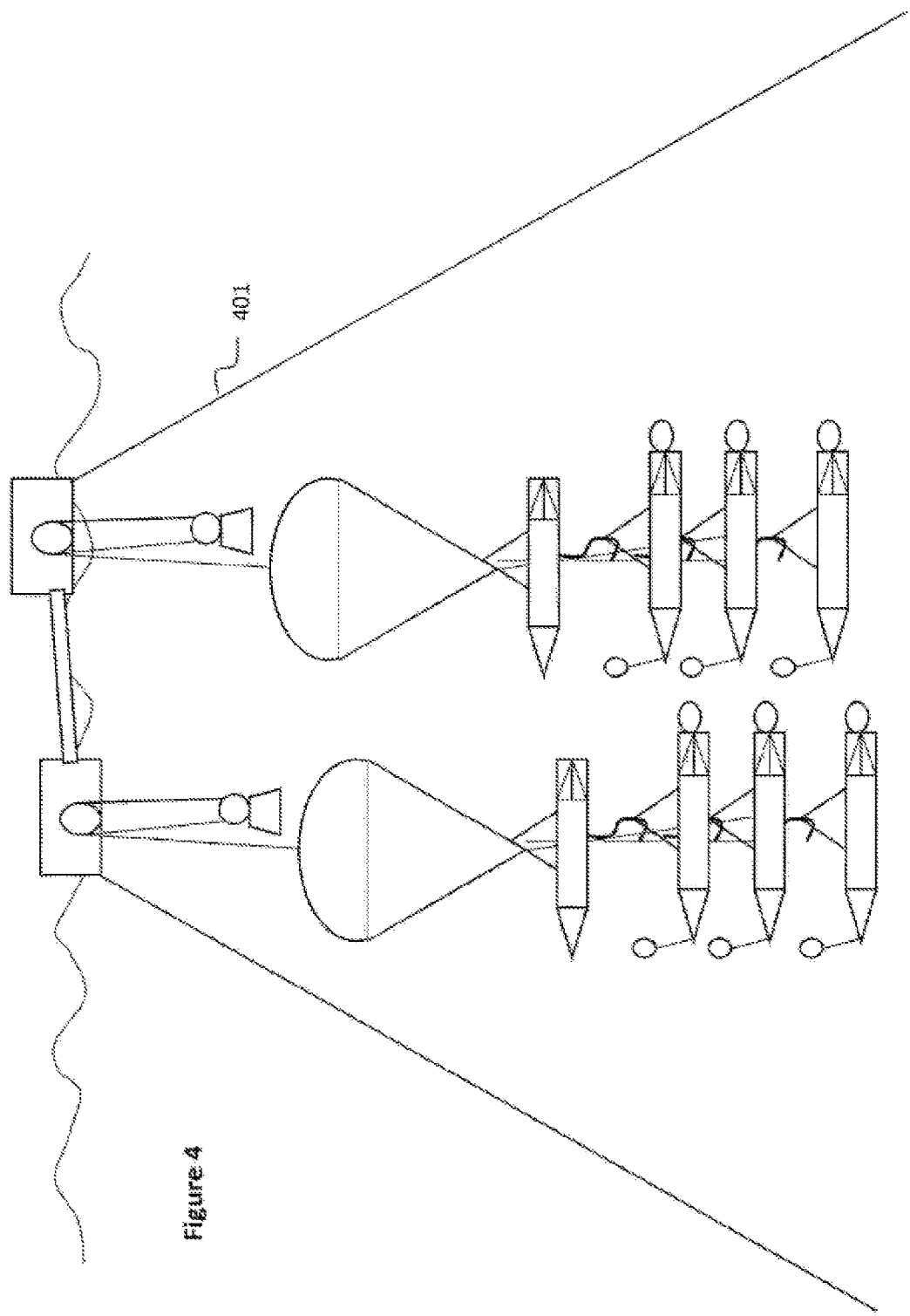
FIG. 4 shows a way to maintain the one or several USPVs in a given position thanks to anchoring cables.

FIG. 4 shows a way to maintain the one or several USPVs in a given position thanks to anchoring cables. In this case, it is anchoring cables (401) (the anchor is not shown in the figure).

FIG. 5 shows another way to maintain the one or several USPVs in a given position thanks to pitch propellers. In this case, it is pitch propellers (501).

FIG. 6 shows the various levels of charge of the USPVs and the various positions of the ballast on the block and tackle.

The position 606 shows a USPV loaded with 3 moving ballasts and 1 fixed ballast, the lifting bag has maximum volume and is positioned at a shallow depth.

The position 607 shows a USPV loaded with 2 moving ballasts and 1 fixed ballast, the lifting bag is then positioned deeper so that the heavier pressure reduces the volume and the Archimedian buoyancy from the lifting bag to uphold only 2 ballasts.

The position 608 shows a USPV loaded with only one moving ballast. The position 603 show an empty USPV without any moving ballast, thus including only one fixed ballast. This fixed ballast prevents the lifting bag from going up, since even deeper, there remains a residual volume that cannot be compensated by the relative weight of the membrane of the empty lifting bag.

The hook 601 is loaded with a ballast while the hook 602 (the other hook of the double block and tackle) is not loaded. No matter if the platform is working in loading or unloading mode (respectively successive uplift or lowering of the ballasts one by one), there is always one loaded hook and one unloaded hook in the double block and tackle.

The position 604 shows ballasts on the sea bottom (605).

Figure 7B:
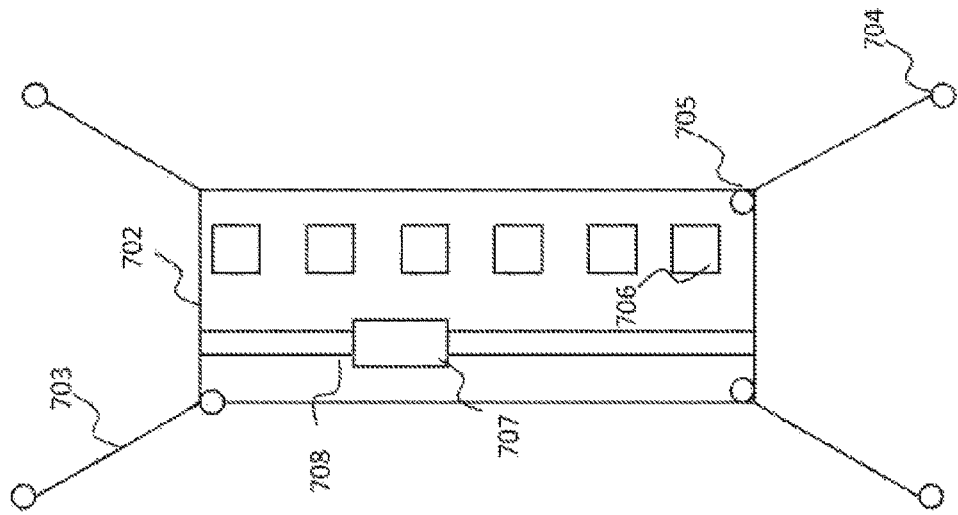
FIGS. 7a and 7b show a variant, where the USPVs and the block and tackle are mounted on a barge.
Figure 7A:
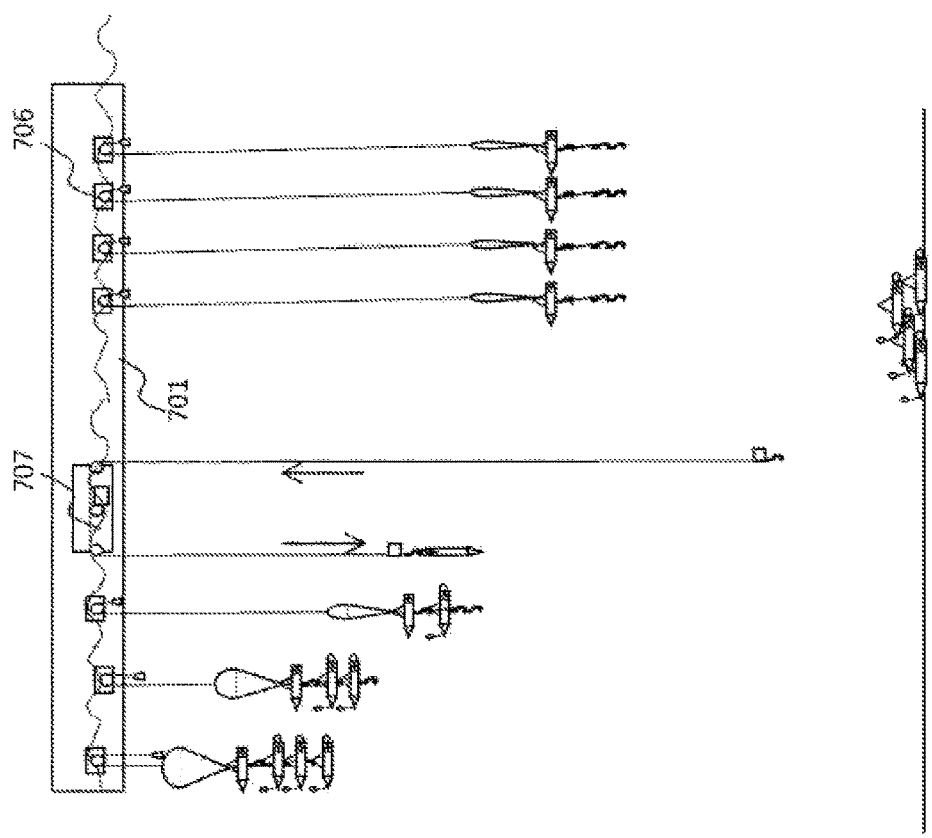

FIGS. 7a and 7b show a variant where the USPVs (706) and the block and tackle (707) are mounted on the same floating structure (here, a barge) (701) seen from a side and 702 seen from above. The block and tackle can be mounted on rails (708). The barge (702) can be anchored through one or several anchoring cables (703), one or several anchors (704) and one or several winches (705).

Figure 8:
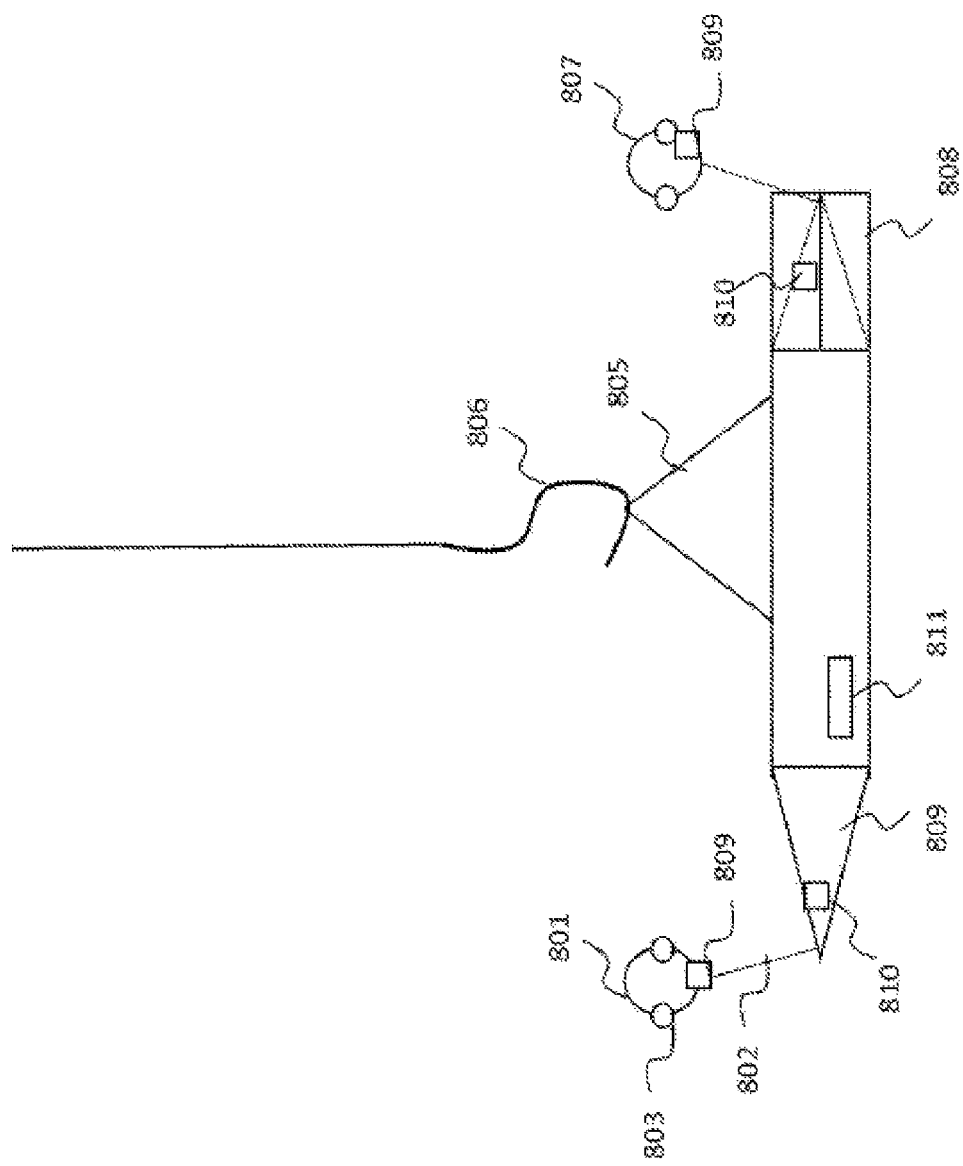
FIG. 8 shows a detail view of the ballast hanging from a hook via an attachment cable.

FIG. 8 shows a detail view of the ballast (809) hanging from a hook (806) via an attachment cable (805) fixed to two points of support of the ballast, so that the center of gravity of the ballast is located between these two points, in order to keep the ballast horizontal. An empennage (808) similar to those of torpedoes positions the ballast face to the horizontal current and thus reduces the hydrodynamic friction force from the current, which reduces the cost to keep USPVs above this zone (no matter with propellers or anchoring cables).

At least two handles (807) are designed to fix the ballasts to the hook of the block and tackle: one in front (for upward movements), the other on the rear (for downward movements). These handles are advantageously made of a cable (for example made of drawn stainless steel) with floats (803) that keep the handles in suspension above the ballast, which makes hooking operations easier, in particular when the ballasts lie on the sea bottom. They are linked to the ballast through a short cable (802) in order to make attaching and detaching and possibly the work of the auxiliary ROV (119 in FIG. 1) easier.

Emitters of light signals (809, 810) or sonars (811) or emitters of any other king of waves are arranged in various places of the ballast or handles to make attaching and detaching easier, particularly if such operations are automated.

Figure 9:
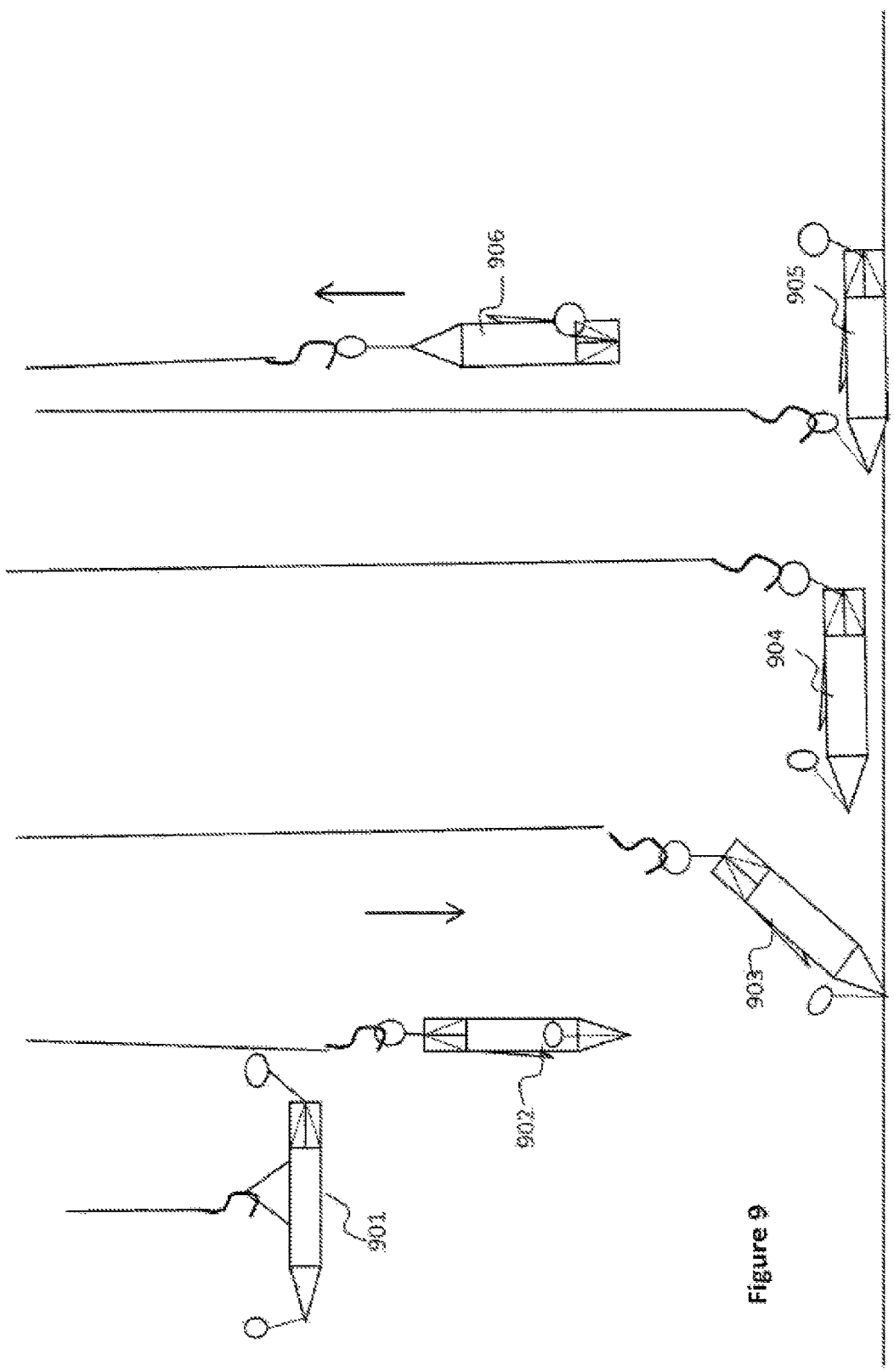
FIG. 9 shows various positions and configurations of the ballasts.

FIG. 9 shows various positions and configurations of the ballasts. The position 901 shows a ballast hooked to a lifting bag (high point position) close to the surface, it is horizontal in order to reduce the hydrodynamic friction force from the current. The position 902 shows a ballast in downward movement; in this case, the ballast draws the hook of the block and tackle downward. The position 903 shows a ballast being laid on to the sea bottom. The position 904 shows a ballast horizontally lying on the sea bottom just after arrival (descent); the hook of the block and tackle is still fixed to the lower handle. The position 905 shows a ballast horizontally lying on the sea bottom, just before uplift; the hook of the block and tackle is hooked to the upper handle. The position 906 shows a ballast in upward movement; the front part of the ballast is positioned above the rear part (which has an empennage).

Figure 10:
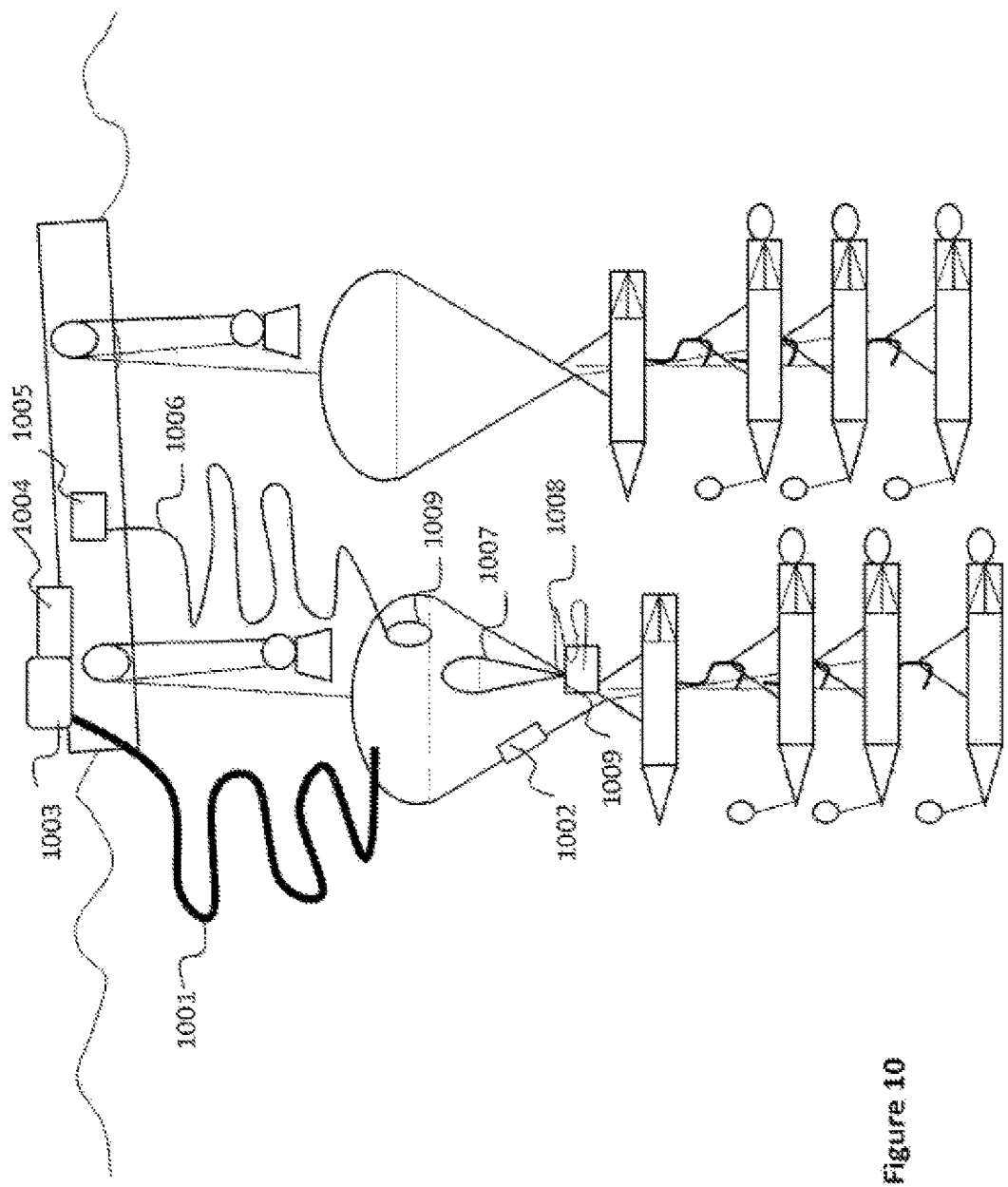
FIG. 10 shows various variants for the immersed float according to the invention.

FIG. 10 shows various variants:

A valve (1001) can be opened with remote control or automatically; it releases any possible surplus of gas and copes with technical failures, in particular if the lifting bag comes up higher than scheduled (for example because of a heating of the gas inside), and thus restricts the risk of brutal surfacing of the lifting bag.

A flexible hose (1001) may link the lifting bag to a compressor (1004) including a possible buffer tank (1003) to increase or reduce the amount of air inside the lifting bag. This device makes it possible to balance the systems in case of technical failures or to temporary restore the balance of the system, for example when the lifting bag has gone up to a higher position and the air within has cooled. This air will heat with the ambient temperature, and a variation of the amount of air inside the lifting bag may be desirable, even if varying depth can play the same role.

Another way to accelerate the warming of the gas inside the lifting bag, for example just after the rise of the level inside the lifting bag (expansion=cooling), is to inject an amount of heat thanks to an electrical resistance (1009) connected through an electrical cable (1006) to a battery (1005) or any other power supply.

A security mechanism makes it possible to quickly increase the floating capacity of the USPV; it includes an auxiliary lifting bag (1007) partly filled with a gas and fixed with a cable (1008) to the main lifting bag. This lifting bag can be released by a remote control (command unit 1009) or automatically if required, when the USPV starts going down too much and, for example, when the upper float reaches a too-significant average immersion level. When releasing this lifting bag, it will go up and its volume will increase; it will then be able to generate a higher Archimedian buoyancy and compensate a possible disbalance.

Figure 11:
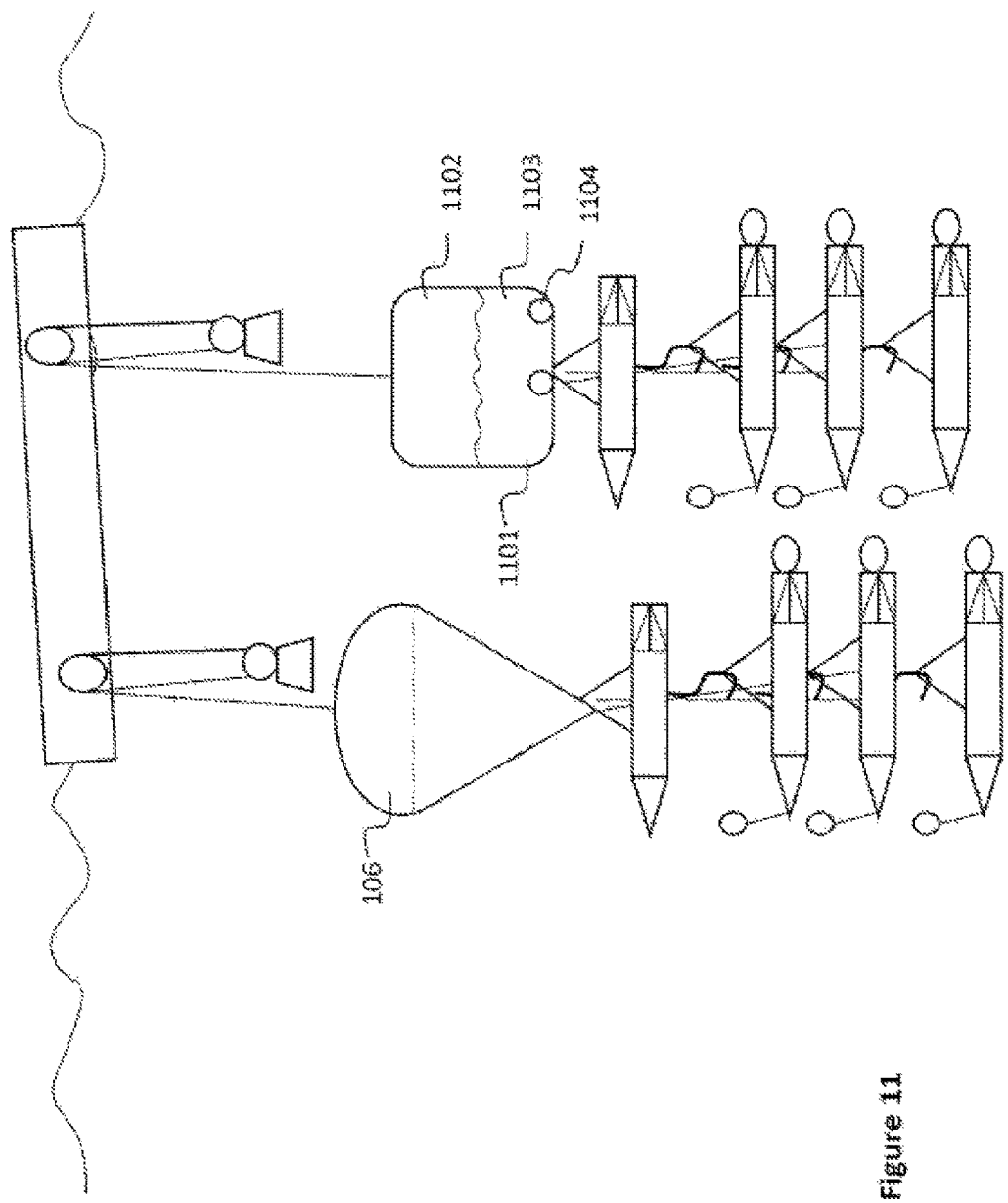
FIG. 11 shows the lifting bag as described in FIG. 1. On the right, there is a ballast partly filled with water and partly filled with gas.

In FIG. 11, you can see the lifting bag as described in FIG. 1 (106) on the left, and a ballast partly filled with water and partly filled with gas on the right. This ballast plays the same role as the lifting bag: its buoyancy will increase when the depth of the ballast decreases, and vice versa.

The amount of water can vary automatically, since the ballast includes several holes to let water in and compress the pocket of gas when the ballast gets down. It can also vary by remote control by injecting gas or by pumping and injecting water via flexible hoses, compressors, pumps and valves not displayed in the figure.

Figure 12:
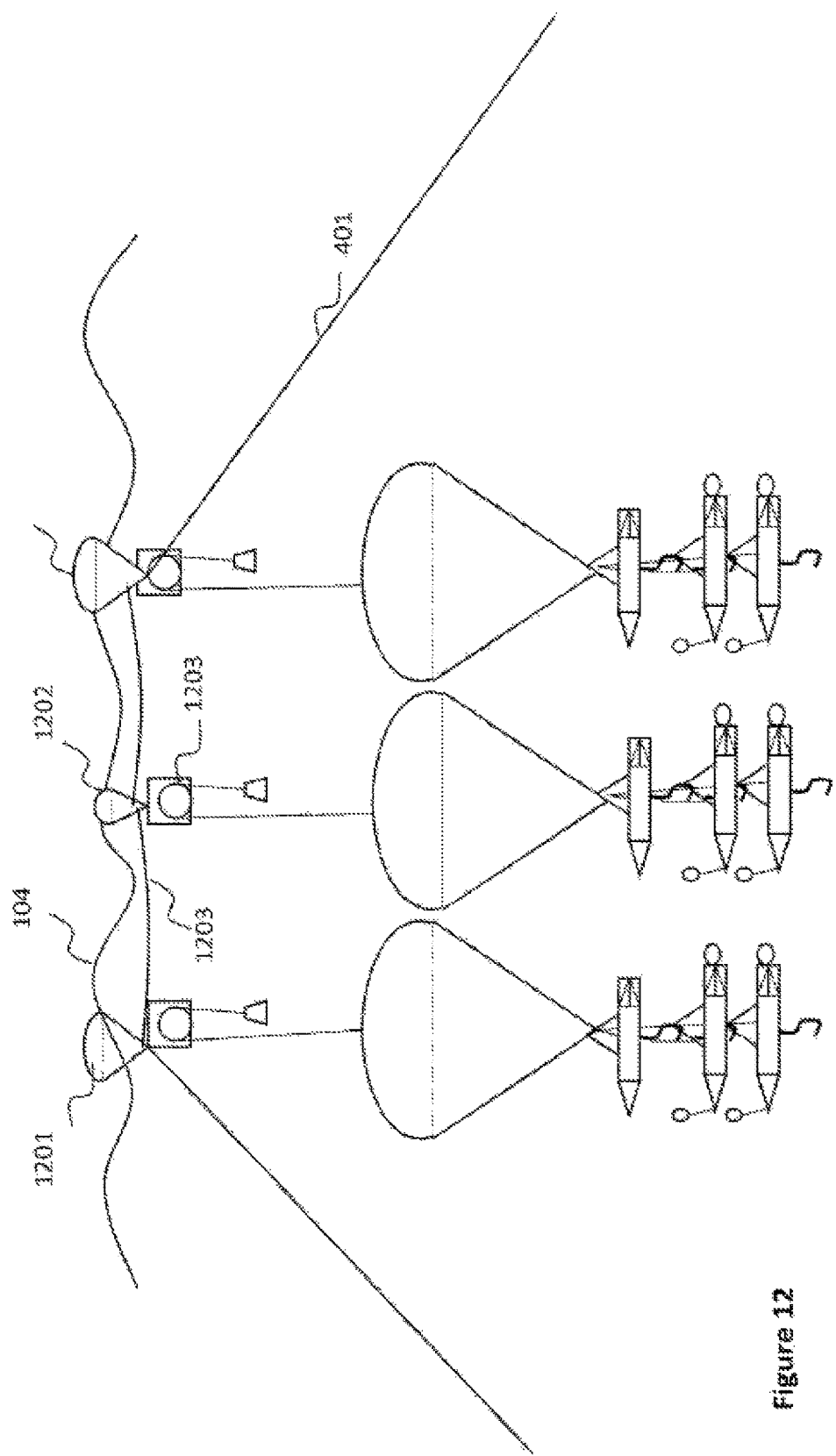
FIG. 12 shows another way to secure the USPVs together.

FIG. 12 shows another way to secure the USPVs together. In this case, they are connected with a cable (1203) via the upper float, which can be rigid (as displayed in FIG. 1, 101) or flexible, which means with a lifting bag as displayed on this FIG. 120 or 1202).

The set of USPVs, attached to each other this way, can also be anchored with one or several anchoring cables (401); the lifting bags that are the upper floats can have an adapted volume to manage the whole forces they are submitted to; these forces can be different whether the system is a USPV only linked to other USPVs or also linked to an anchoring cable.

Figure 13:
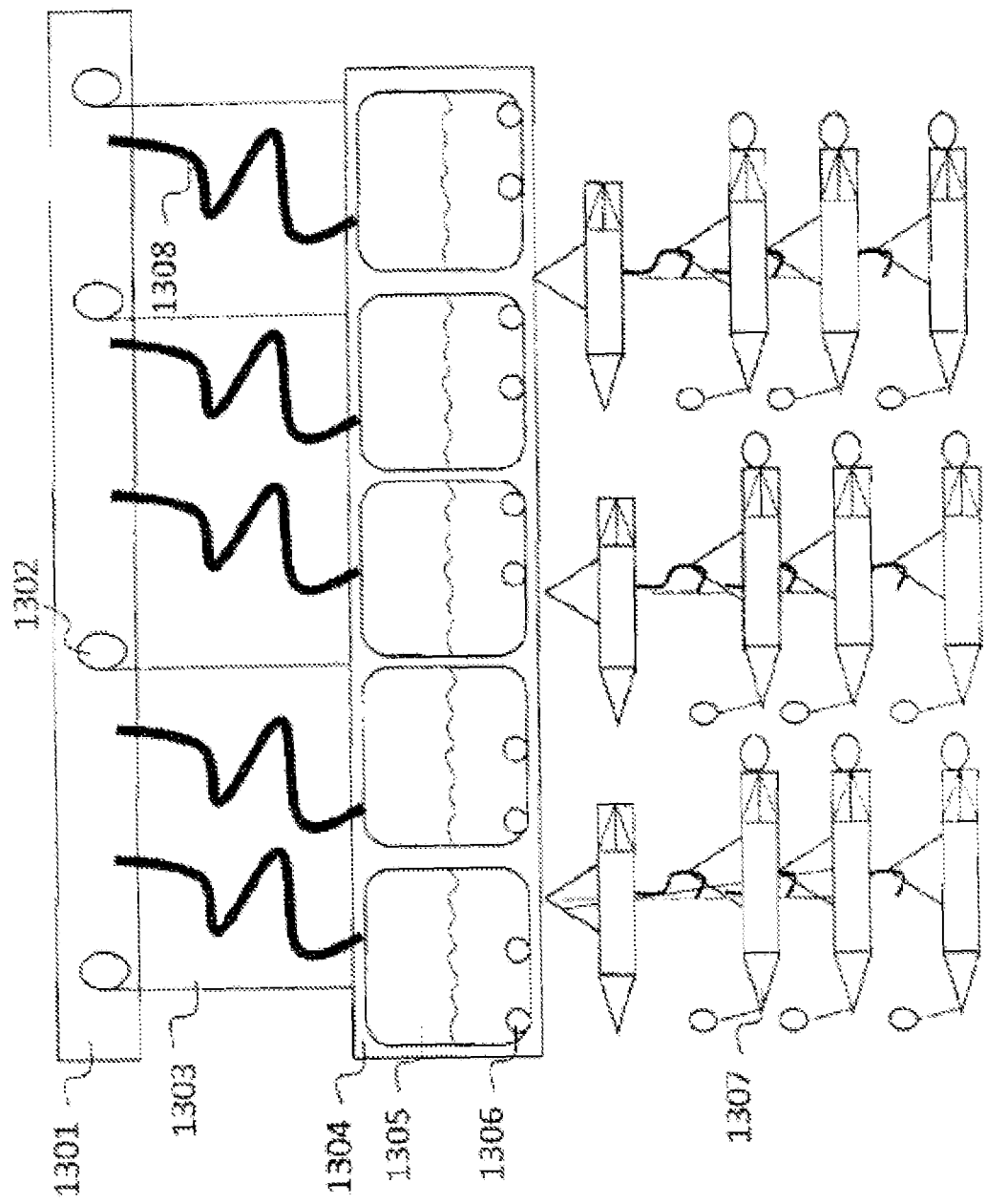
FIG. 13 shows a structure including several ballasts linked to a barge with several winches or pulleys.

FIG. 13 shows a barge (1301) including several winches (or pulleys) (1302) that are linked to as many anchoring cables (1303) to uphold a structure (1304) including several ballasts (whose number may differ from the number of cables 1303). The ballasts include at least water input- and output holes (1306) and at least one pressured gas intake- and/or outtake hose (1308). The appliance also includes cables to hook ballasts (1307); the number of fixation points of these ballasts and/or the number of ballasts may be different from the number of cables 1303.

Figure 14:
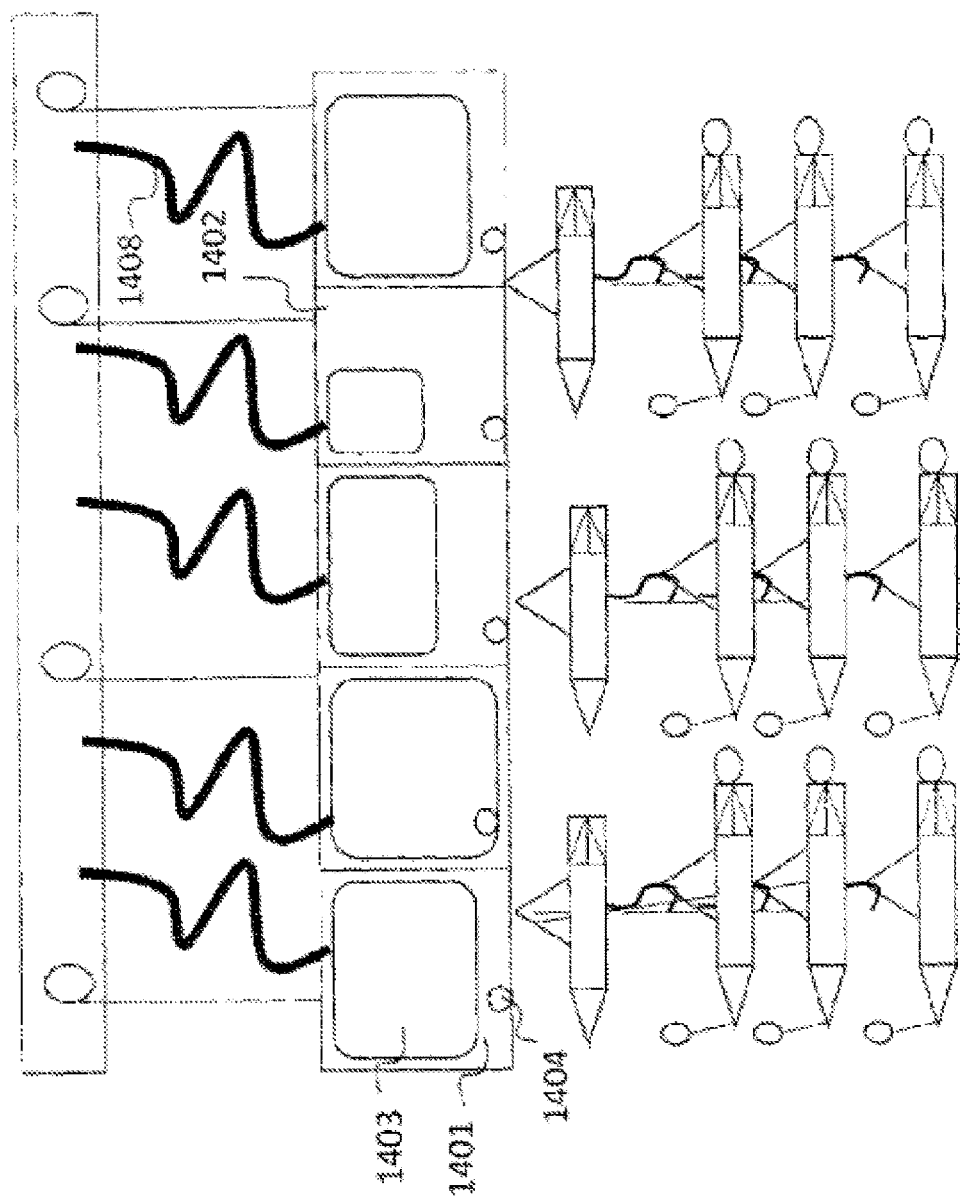
FIG. 14 shows a variant of the structure of FIG. 13, where each ballast includes a flexible wrap as a bladder or a lifting bag.

FIG. 14 shows a variant of the structure of FIG. 13. The ballasts are located inside a (possibly compartmentalized) structure (1401), where there are several bladders (or lifting bags) (103), which are connected to pressured gas pipes. In this variant, each compartment also includes a hole (1404).

It shall be understood that the structure can include several "blocks and tackles" platforms and several blocks and tackles (or double blocks and tackles) may be positioned on only one barge.

The number of ballasts per USPV in the figures is exemplary but not restrictive. You can store only one or far more ballasts on a USPV.

The invention is essentially illustrated in "double block and tackle" mode, but other equivalent systems can be considered (lifts, driving pulleys, capstan, etc.)

Hooks can have an automatic or remote controlled complete closure, if required, out of security.

In every variant, the USPVs may be connected with various electrical, hydraulic or pneumatic connections.

What is claimed is:

1. An electrical energy storage and production system for use in a marine environment, wherein at least one ballast is lowered and raised between a high position and a low position by at least one cable connected to a surface-floating element, the system comprising a generator configured to actuate said at least one cable or be actuated by said at least one cable, wherein said at least one ballast is stabilized in the high position at a specified depth when secured together with a partially floating element at said depth, said partially floating element being connected through a retaining cable to a secondary surface-floating element equipped with means to change a length of said retaining cable, whereby the partially floating element includes a volume of compressible gas according to an environmental pressure.

2. The system according to the claim 1, where the gas volume is delineated by a flexible wrap.

3. The system according to claim 1, comprising several partially floating elements with secondary surface-floating elements.

4. The system according to claim 1, wherein the surface-floating element is a barge with a block and tackle.

5. The system according to claim 4, comprising multiple blocks and tackles.

6. The system according to claim 3, wherein the several partially floating elements are secured with each other.

7. The system according to claim 3, wherein the surface-floating elements are secured with each other.

8. The system according to claim 1, wherein the retaining cable can be unrolled from about 5 meters to about 150 meters.

9. The system according to claim 1, wherein the at least one ballast can be detached from and attached to the partially floating element by hooking-unhooking.

10. The system according to claim 9, wherein the hooking-unhooking is accomplished via an independent submarine.

11. The system according to claim 1, comprising multiple partially floating elements each associated with a retaining cable, and wherein the retaining cables are unrolled at different lengths.

12. The system according to claim 1, comprising at least one ballast having a water intake and outtake hole.

13. The system according to claim 12, wherein the at least one ballast having the water intake and outtake hole includes at least one pressured gas intake and/or outtake hose.

14. The system according to claim 12, wherein the at least one ballast having the water intake and outtake hole includes a bladder connected to one or more pressured gas hoses.

15. An electrical energy storage and production system for use in a marine environment, wherein at least one ballast is lowered and raised between a high position and a low position by at least one cable connected to a surface-floating element, the system comprising a generator configured to actuate said at least one cable or be actuated by said at least one cable, wherein said at least one ballast is may be stabilized in the high position at a specified depth when secured together with a float, said float including a partially floating element at said depth, said partially floating element being connected through a retaining cable to a second surface-floating element equipped with means to change a length of said retaining cable, whereby the partially floating element includes a volume of compressible gas according to an environmental pressure.

16. An electrical energy storage and production system for use in a marine environment, the system comprising:
   a barge or platform equipped with means to roll and/or unroll a main cable to which a ballast can be hooked or unhooked up to a depth of 200 meters or more, whereby said means cooperate with an engine coupled with an electrical energy generator;
   a float including one part on the surface and another bigger part immersed, wherein both parts of said float are linked with a retaining cable, and wherein the immersed part carries at least one ballast and is located at a depth between 10 meters and 150 meters;
   a gas volume within the immersed part of the float, which may vary with the environmental pressure;
   means to change a length of said retaining cable of said float;

reversible means to transfer the ballast from the immersed part of said float to an immersed end of the main cable;
means for hooking and unhooking the ballast to a sea bottom.

17. The system according to claim 1, wherein the retaining cable can be unrolled from about 10 meters to about 100 meters.

18. The system according to claim 10, wherein the submarine includes a robot.

* * * * *